(12) United States Patent
Wiklof

(10) Patent No.: US 9,469,819 B2
(45) Date of Patent: Oct. 18, 2016

(54) GASIFIER CONFIGURED TO ELECTRODYNAMICALLY AGITATE CHARGED CHEMICAL SPECIES IN A REACTION REGION AND RELATED METHODS

(71) Applicant: ClearSign Combustion Corporation, Seattle, WA (US)

(72) Inventor: Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 264 days.

(21) Appl. No.: 14/153,554

(22) Filed: Jan. 13, 2014

(65) Prior Publication Data

US 2014/0196369 A1    Jul. 17, 2014

Related U.S. Application Data

(60) Provisional application No. 61/753,076, filed on Jan. 16, 2013.

(51) Int. Cl.
*B01J 7/00* (2006.01)
*C10J 3/18* (2006.01)
(Continued)

(52) U.S. Cl.
CPC ............ *C10J 3/18* (2013.01); *C10J 3/485* (2013.01); *C10J 3/723* (2013.01); *C10J 2200/12* (2013.01); *C10J 2300/093* (2013.01); *C10J 2300/1846* (2013.01); *Y02P 20/145* (2015.11)

(58) Field of Classification Search
CPC .............................. F23C 99/001; F23D 11/32
See application file for complete search history.

(56) References Cited

U.S. PATENT DOCUMENTS 2,604,936 A    7/1952   Kaehni et al.
3,129,062 A    4/1964   Ongkiehong et al.
(Continued)

FOREIGN PATENT DOCUMENTS

EP    1139020    10/2001
EP    1139020    8/2006
(Continued)

OTHER PUBLICATIONS

Timothy J.C. Dolmansley et al., Electrical Modification of Combustion and the Affect of Electrode Geometry on the Field Produced, Modelling and Simulation in Engineering, May 26, 2011, 1-13, vol. 2011, Himdawi Publishing Corporation.
(Continued)

*Primary Examiner* — Imran Akram
(74) *Attorney, Agent, or Firm* — Dorsey & Whitney LLP

(57) ABSTRACT

Embodiments are directed to a gasifier that electrodynamically agitates charged chemical species in a reaction region of a reaction vessel of a gasifier and related methods. In an embodiment, a gasifier includes a reaction vessel configured to gasify at least one hydrocarbon-containing feed material to synthesis gas. The reaction vessel includes an inlet(s) for receiving a gasification medium that reacts with the at least one hydrocarbon-containing feed material and an outlet for allowing the synthesis gas to exit from the reaction vessel, and a reaction region. The gasifier includes at least one electrode positioned to be in electrical communication with the reaction region, and a voltage source operatively coupled to the at least one electrode. The voltage source and the at least one electrode are cooperatively configured to generate a time varying electric field in the reaction region to effect electrodynamic mixing of charged chemical species therein during gasification.

17 Claims, 9 Drawing Sheets

(51) Int. Cl.
*C10J 3/48* (2006.01)
*C10J 3/72* (2006.01)

(56) References Cited

U.S. PATENT DOCUMENTS

| | | | |
|---|---|---|---|
| 3,224,485 A | 12/1965 | Blomgren et al. | |
| 3,306,338 A | 2/1967 | Wright et al. | |
| 3,416,870 A | 12/1968 | Wright | |
| 3,749,545 A | 7/1973 | Velkoff | |
| 3,841,824 A | 10/1974 | Bethel | |
| 4,091,779 A | 5/1978 | Saufferer et al. | |
| 4,111,636 A | 9/1978 | Goldberg | |
| 5,069,765 A * | 12/1991 | Lewis | C10J 3/18 204/170 |
| 5,607,487 A * | 3/1997 | Taylor | B01D 45/12 48/111 |
| 5,958,264 A * | 9/1999 | Tsantrizos | C03B 5/005 110/250 |
| 6,247,921 B1 | 6/2001 | Helt | |
| 7,137,808 B2 | 11/2006 | Branston et al. | |
| 7,243,496 B2 | 7/2007 | Pavlik et al. | |
| 8,082,725 B2 | 12/2011 | Younsi et al. | |
| 2002/0195032 A1* | 12/2002 | Imai | F23C 99/001 110/250 |
| 2005/0208442 A1 | 9/2005 | Heiligers et al. | |
| 2005/0208446 A1 | 9/2005 | Jayne | |
| 2007/0020567 A1 | 1/2007 | Branston et al. | |
| 2007/0261303 A1* | 11/2007 | Surma | B09B 3/005 48/197 R |
| 2007/0272131 A1* | 11/2007 | Carabin | C10J 3/18 110/250 |
| 2007/0289509 A1* | 12/2007 | Vera | C10J 3/18 110/250 |
| 2009/0064661 A1* | 3/2009 | Younsi | F23C 15/00 60/247 |
| 2011/0027734 A1 | 2/2011 | Hartwick et al. | |
| 2011/0072786 A1 | 3/2011 | Tokuda et al. | |
| 2011/0203771 A1 | 8/2011 | Goodson et al. | |
| 2011/0256330 A1* | 10/2011 | Yamagata | C01B 33/12 428/34.6 |
| 2012/0020844 A1* | 1/2012 | Foret | A23B 4/015 422/184.1 |
| 2013/0004902 A1 | 1/2013 | Goodson et al. | |
| 2013/0071794 A1 | 3/2013 | Colannino et al. | |
| 2013/0170090 A1 | 7/2013 | Colannino et al. | |
| 2013/0192979 A1* | 8/2013 | Xu | F23C 99/001 204/164 |
| 2013/0255548 A1* | 10/2013 | Goodson | F23G 5/442 110/342 |
| 2015/0338089 A1* | 11/2015 | Krichtafovitch | F23N 5/00 431/8 |

FOREIGN PATENT DOCUMENTS

| | | |
|---|---|---|
| JP | 2001033040 | 2/2001 |
| WO | WO 95/34784 | 12/1995 |
| WO | WO 96/01394 | 1/1996 |
| WO | WO 2012097496 A1 * | 7/2012 ............ F23C 99/001 |
| WO | WO 2013/181569 | 12/2013 |

OTHER PUBLICATIONS

U.S. Appl. No. 61/753,076, filed Jan. 16, 2013, Wiklof.

* cited by examiner

GASIFIER CONFIGURED TO ELECTRODYNAMICALLY AGITATE CHARGED CHEMICAL SPECIES IN A REACTION REGION AND RELATED METHODS

CROSS-REFERENCE TO RELATED APPLICATIONS

This application claims priority to U.S. Provisional Application No. 61/753,076 filed on 16 Jan. 2013, the disclosure of which is incorporated herein, in its entirety, by this reference.

BACKGROUND

Gasification is a process that converts organic- or fossil-based carbonaceous materials into fuel gases (e.g., carbon monoxide, hydrogen, methane, etc.). Depending on the feedstock, additional gases may be generated, such as carbon dioxide and nitrogen. Gasification is achieved by reacting feed material (e.g., wood, coal, municipal solid waste, recycled tires, refuse derived fuel ("RDF"), or the like) at high temperatures (e.g., >700° C.), without substantially any combustion, and with a controlled amount of oxygen and/or steam. The resulting gas mixture is called synthesis gas (also known as syngas) or producer gas and is itself a fuel. The power derived from gasification and combustion of the resultant gas is considered to be a source of renewable energy if the gasified compounds were obtained from biomass.

The advantage of gasification is that using the synthesis gas is potentially more efficient than direct combustion of the original fuel because it can be combusted at higher temperatures or even in fuel cells. Synthesis gas may be burned directly in gas engines, used to produce methanol and hydrogen, or converted into liquid fuels. Gasification can also begin with material that would otherwise have been disposed of such as biodegradable waste. In addition, the high-temperature process can refine out corrosive ash elements such as chloride and potassium, allowing clean gas production from otherwise problematic fuels. Gasification of fossil fuels is currently widely used on industrial scales to generate electricity.

SUMMARY

Embodiments disclosed herein are directed to a gasifier configured to electrodynamically agitate charged chemical species in a reaction region of a reaction vessel of the gasifier and related methods. In an embodiment, a gasifier includes a reaction vessel configured to gasify at least one hydrocarbon-containing feed material to synthesis gas. The reaction vessel includes at least one inlet configured to receive a gasification medium that reacts with the at least one hydrocarbon-containing feed material and an outlet configured to allow the synthesis gas to exit from the reaction vessel, and a reaction region. The gasifier further includes at least one electrode positioned to be in electrical communication with the reaction region. The gasifier also includes a voltage source operatively coupled to the at least one electrode. The voltage source and the at least one electrode are cooperatively configured to generate a time varying electric field in the reaction region to effect electrodynamic agitation of charged chemical species therein during gasification.

In an embodiment, a method of agitating charged chemical species in a reaction volume of a reaction vessel of a gasifier during gasifying at least one hydrocarbon-containing feed material is disclosed. The at least one hydrocarbon-containing feed material may be introduced into the reaction vessel of the gasifier. At least a portion of the at least one hydrocarbon-containing feed material is gasified to generate synthesis gas. During the act of gasifying, a time varying voltage may be applied to at least one electrode to generate a time varying electric field in the reaction region that agitates at least some of the charged chemical species.

Features from any of the disclosed embodiments may be used in combination with one another, without limitation. In addition, other features and advantages of the present disclosure will become apparent to those of ordinary skill in the art through consideration of the following detailed description and the accompanying drawings.

DETAILED DESCRIPTION

Figure 1:
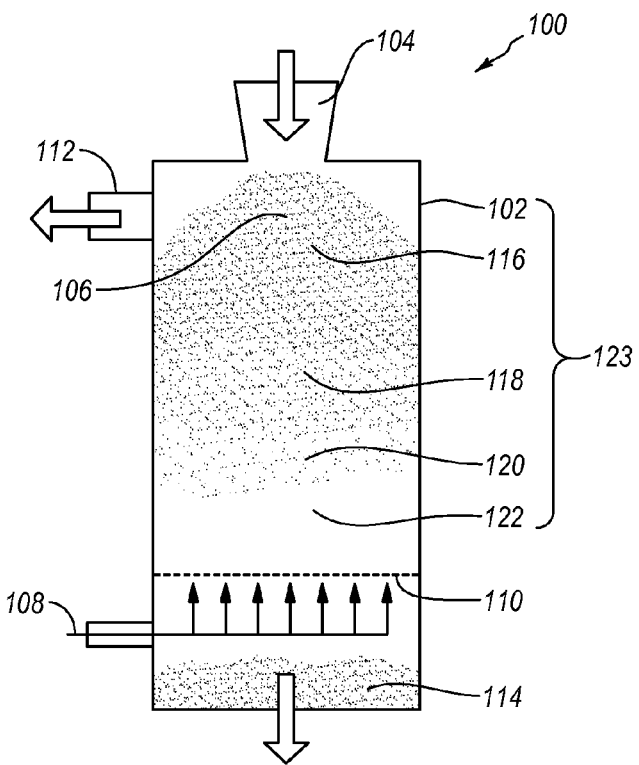
FIG. 1 is a schematic diagram illustrating an up draft gasifier according to an embodiment.

Embodiments disclosed herein are directed to a gasifier configured to electrodynamically agitate charged chemical species in a reaction region of a reaction vessel of the gasifier and related methods. The gasifiers disclosed herein include a reaction vessel having at least one electrode positioned therein. The at least one electrode may have a time varying voltage waveform applied thereto that generates an electric field effective to agitate (e.g., mix) charged chemical species during gasification of at least one hydrocarbon-containing feed material, such as wood, coal, municipal solid waste, recycled tires, or RDF. Agitation of the chemical species in the reaction region may cause an increase in a gasification reaction rate; a reduction in a temperature of the gasification reaction; an efficiency increase in the gasification reaction; a change in a gasification reaction product generated during the act of gasifying; or combinations of the foregoing.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

Figure 2:
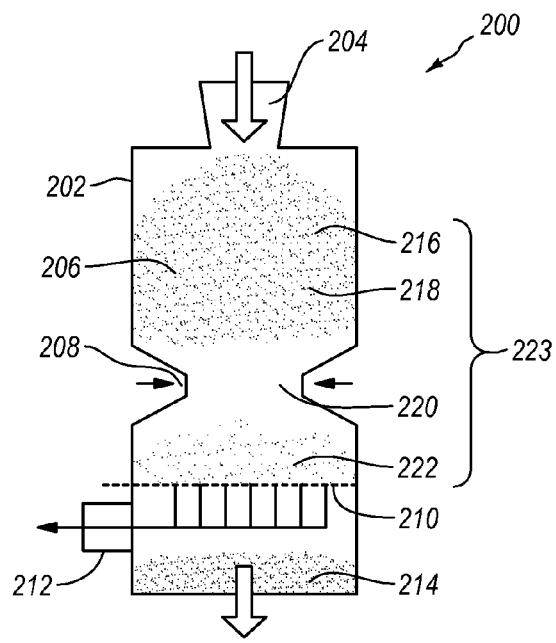
FIG. 2 is a schematic diagram illustrating a down draft gasifier according to an embodiment.

FIGS. 1 and 2 are schematic diagrams illustrating embodiments of two types of gasifiers in which any of the disclosed electrode systems may be incorporated. FIG. 1 illustrates a schematic diagram of an up draft gasifier 100. FIG. 2 illustrates a schematic diagram of a down draft gasifier 200.

The up draft gasifier 100 includes a reaction vessel 102, and a fuel hopper 104 that is positioned at an upper region of the reaction vessel 102 and configured to allow feeding fuel 106 into the reaction vessel 102. For example, the fuel 106 may include wood, coal, municipal solid waste, recycled tires, RDF, or combinations thereof. In the up draft gasifier 100, the fuel 106 fed in through the fuel hopper 104 slowly sinks downwards by gravity as conversion of fuel conversion proceeds, eventually forming ash 114. The up draft gasifier 100 further includes one or more inlets 108 positioned and configured to allow feeding a gasification medium (e.g., a blend of air, steam, and supplemental oxygen) into the reaction vessel 102. The gasification medium passes through a grate 110 positioned below the fuel hopper 104 and above the inlet 108, flows up through the fuel bed 106, and flows out an outlet 112. In an up draft gasifier 100, the gas flowing out of the outlet 112 includes synthesis gas (e.g., $H_2$, CO, $CH_4$, combinations thereof, etc.) in addition to the products of decomposition released by pyrolysis of the fuel and steam released as a result of fuel drying.

The down draft gasifier 200 is similar to the up draft gasifier 100, except that, as the name suggests, the relative orientations of the inlet and outlets are reversed. The down draft gasifier 200 includes a reaction vessel 202, a fuel hopper 204 that is positioned at an upper region of the reaction vessel 202 and configured for feeding fuel 206 into the reaction vessel 202. As with the up draft gasifier 100, the fuel 206 fed in through the fuel hopper 204 slowly sinks downwards by gravity as conversion of fuel conversion proceeds, eventually forming ash 214. The down draft gasifier 200 includes one or more inlets 208 positioned and configured to allow feeding a gasification medium (e.g., a blend/mixture including air, steam, and supplemental oxygen) into the reaction vessel 202. The gasification medium passes down through the fuel bed 206, through a grate 210, and out an outlet 212 positioned below the grate 210. The gas flowing out of the outlet 212 includes synthesis gas (e.g., $H_2$, CO, $CH_4$, combinations thereof, etc.). One difference between the up draft gasifier 100 and the down draft gasifier 200 is that the synthesis gas produced by the down draft gasifier 200 does not tend to be as contaminated with the products of decomposition released by pyrolysis of the fuel and steam released as a result of fuel drying.

The gasifiers 100 and 200 include a number of distinct reaction zones in their fuel beds 106 and 206. The fuel bed 106 includes a drying zone 116 positioned proximate to the hopper 104, a pyrolysis zone 118, an oxidation zone 120 positioned above the grate 110, and a reduction zone 122 positioned above the grate 110 that collectively define a reaction region 123. The fuel bed 206 includes a drying zone 216 positioned proximate the hopper 204, a pyrolysis zone 218, an oxidation zone 220 positioned above the grate 210, and a reduction zone 222 positioned above the grate 210 that collectively define a reaction region 223.

In the drying zones 116 and 216, the fuel is dried at about 100° C. to about 150° C. Typically, the resulting steam is mixed into the gas flow and may be involved with subsequent chemical reactions, notably the water-gas reaction if the temperature is sufficiently high enough.

In the pyrolysis zone 118 and 218, the pyrolysis (or devolatilization) process may occur at about 200° C. to about 300° C. Volatiles are released and char is produced, resulting in significant weight loss for the fuel (e.g., up to about 70% weight loss for coal). The process is dependent on the properties of the carbonaceous material and determines the structure and composition of the char, which will then undergo gasification reactions.

The oxidation zone 120 and 220 and the reduction zone 122 and 222 are where the important reactions of gasification occur. The major difference between combustion and gasification from the point of view of the chemistry involved is that combustion takes place under oxidizing conditions, while gasification occurs under reducing conditions without combustion substantially occurring. In the gasification process, a carbon-based feedstock, in the presence of steam and oxygen at high temperature and moderate pressure, is converted in the reaction vessel 102/202 to synthesis gas (e.g., a mixture of carbon monoxide and hydrogen), which is generally referred to as syngas. The chemistry of gasification is quite complex and involves many chemical reactions. Some of the more important chemical reactions occurring in the oxidation zone 120 and 220 and the reduction zone 122 and 222 are:

$$C + O_2 \rightarrow CO_2 \; \Delta H_r = -393.4 \text{ MJ/kmol} \quad (1)$$

$$C + \tfrac{1}{2} O_2 \rightarrow CO \; \Delta H_r = -111.4 \text{ MJ/kmol} \quad (2)$$

$$C + H_2O \rightarrow H_2 + CO \; \Delta H_r = 130.5 \text{ MJ/kmol} \quad (3)$$

$$C + CO_2 \leftrightarrow 2CO \; \Delta H_r = 170.7 \text{ MJ/kmol} \quad (4)$$

$$CO + H_2O \leftrightarrow H_2 + CO_2 \; \Delta H_r = -40.2 \text{ MJ/kmol} \quad (5)$$

$$C + 2H_2 \rightarrow CH_4 \; \Delta H_r = -74.7 \text{ MJ/kmol} \quad (6)$$

Reactions (1) and (2) are exothermic oxidation reactions and provide most of the energy required by the endothermic gasification reactions (e.g., reactions (3) and (4)). The oxidation reactions may occur very rapidly, and substantially completely consume all of the oxygen present in the gasifier so that most of the gasifier operates under reducing conditions. Reaction (5) is known as the water-gas shift reaction, which converts CO into $H_2$. The water-gas shift reaction alters the $H_2/CO$ ratio in the final mixture, but does not greatly impact the heating value of the synthesis gas, because the heats of combustion of $H_2$ and CO are, on a molar basis, almost identical. Methane formation in Reaction (6) is favored by high pressures and low temperatures and is, thus, mainly important in lower temperature gasification systems. Methane formation is an exothermic reaction that does not consume oxygen and, therefore, increases the efficiency of gasification and the final heating value of the synthesis gas. Overall, about 70% of the fuel's heating value is associated with the CO and $H_2$ in the gas, but this can be higher depending upon the type of gasifier.

Depending on the gasifier technology employed and the operating conditions, significant quantities of $H_2O$, $CO_2$, and $CH_4$ may be present in the synthesis gas, as well as a number of minor and trace components. Under the reducing conditions in the gasifier, most of the fuel's sulfur converts to hydrogen sulfide ($H_2S$), but about 3% to about 10% converts to carbonyl sulfide (COS). Fuel-bound nitrogen generally converts to gaseous nitrogen ($N_2$), but some ammonia ($NH_3$) and a small amount of hydrogen cyanide (HCN) are also formed. Most of the chlorine in the fuel is converted to HCl with some chlorine present in the particulate phase. Trace elements, such as mercury and arsenic, are released during gasification and partition among the different phases, such as fly ash, bottom ash, slag, and product gas.

Many other reactions, besides those listed above may occur. In the initial stages of gasification, the rising temperature of the feedstock initiates devolatilization of the feedstock and the breaking of weaker chemical bonds to yield tars, oils, phenols, and hydrocarbon gases. These products generally react further to form $H_2$, CO, and $CO_2$. The fixed carbon that remains after devolatilization reacts with oxygen, steam, $CO_2$, and $H_2$.

Various different types of positively and negatively charged chemical species are generated during and prior to completion of the Reactions (1)-(6) in the reaction regions 123 and 223. Sometimes, positively charged chemical species may be attached to fuel fragments. In addition to negatively charged chemical species, electrons are another type of negatively charged particles present in the reaction region of a gasifier.

Various embodiments disclosed herein are directed to gasifiers including at least one electrode configured to electrodynamically agitate charged chemical species in one or more, two or more, or all of the zones of the reaction region of the reaction vessel of a gasifier. For example, one or more electrodes may be positioned in a drying zone, a pyrolysis zone, an oxidation zone, a reduction zone of the reaction region, or combinations thereof. For example, each or some of the zones of the reaction region may include its own corresponding one or more electrodes or each zone of the reaction region may share a common one or more electrodes. The at least one electrode used in the gasifiers may be used in either updraft gasifiers, downdraft gasifiers, or any other suitable type of gasifier, such as fluidized bed reactors, entrained flow gasifiers, plasma gasifiers, or free radical gasifiers.

Figure 3A:
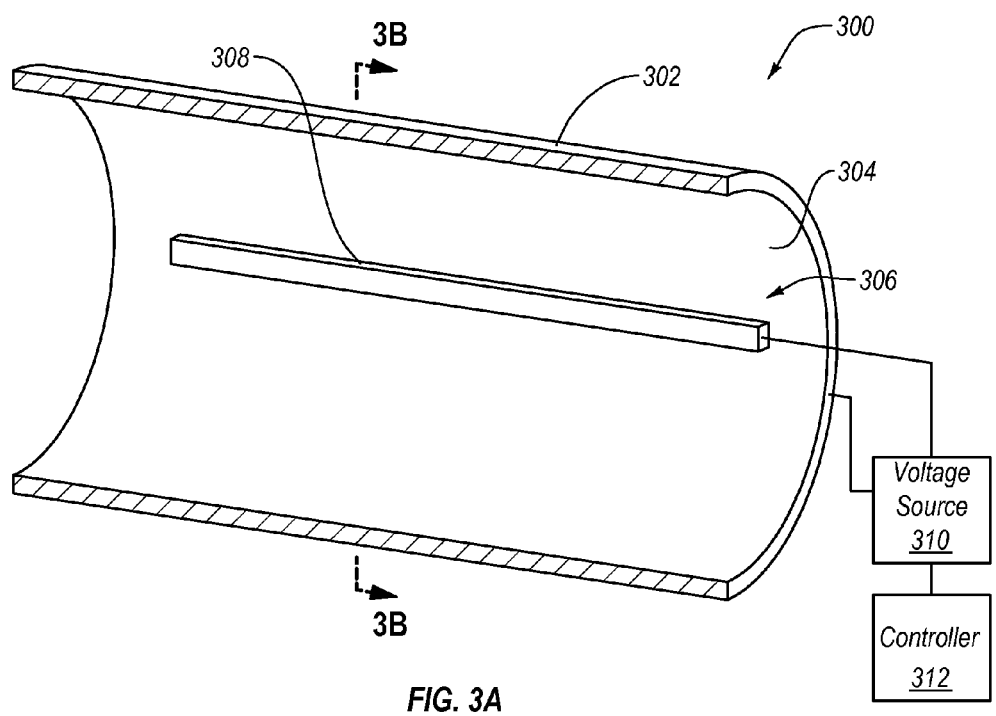
FIG. 3A is an isometric cutaway view of a gasifier including a longitudinally extending electrode that may be used to cause electrodynamic agitation of charged chemical species during gasification according to an embodiment.

FIG. 3A is an isometric cutaway view of a gasifier 300 according to an embodiment. The gasifier 300 includes a reaction vessel 302 having an interior surface 304 at least partially defining a reaction region 306 in which gasification reactions occur, such as the oxidation and reduction reactions previously discussed herein. An electrode 308 is mounted to the interior surface 304 and extends longitudinally along the interior surface 304 through at least part of the reaction region 306. For example, the electrode 308 may be positioned in a drying zone, a pyrolysis zone, an oxidation zone, a reduction zone of the reaction region 306, or combinations thereof. A voltage source 310 is operatively coupled to the electrode 308 and to, for example, the reaction vessel 302 may function as an additional electrode or ground. A controller 312 is provided that is operatively coupled to the voltage source 310, and controls the operation of the voltage source 310.

Figure 3B:
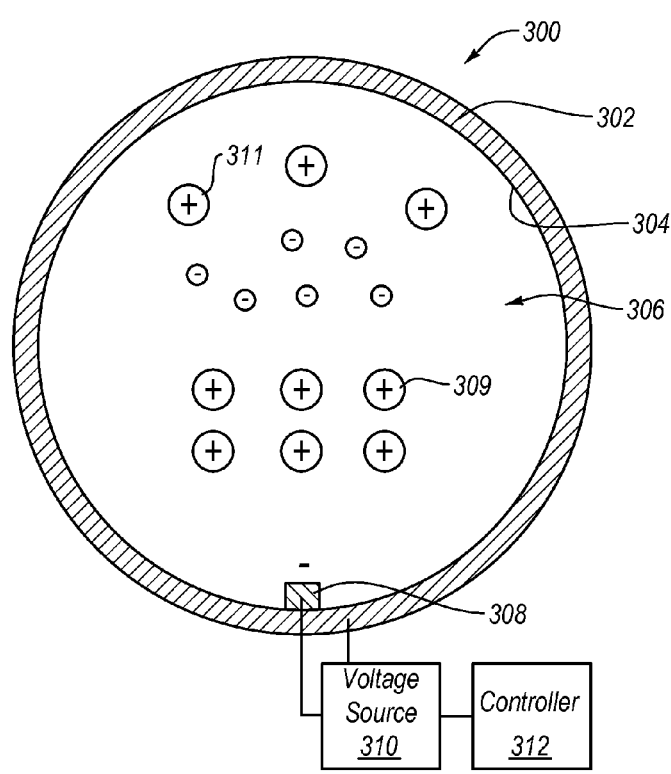
FIG. 3B is a cross-sectional view of the reaction vessel of FIG. 3A taken along line 3A-3A thereof in which the electrode is negatively biased.
Figure 3C:
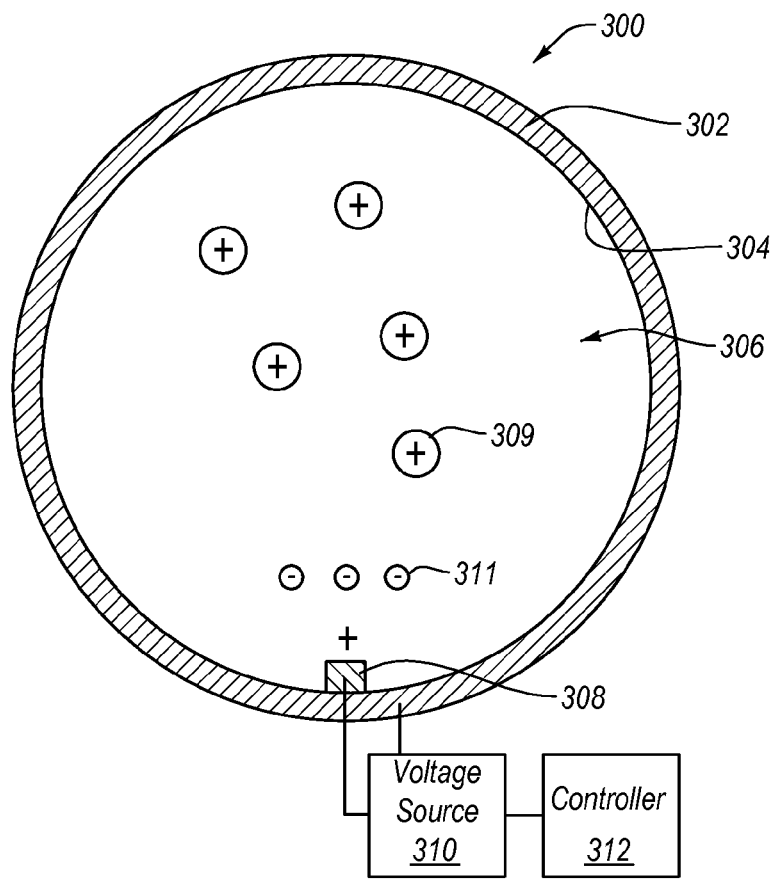
FIG. 3C is a cross-sectional view of the reaction vessel of FIG. 3A taken along line 3A-3A thereof in which the electrode is positively biased.

FIGS. 3B and 3C are cross-sectional views of the gasifier 300 illustrating how applying a time varying voltage waveform via the voltage source 310 generates a time varying electric field effective to repel or attract charged chemical species of different polarity during gasification of at least one carbon-containing feed material introduced into the reaction region 306. For example, FIG. 3B illustrates that when the electrode 308 is negatively charged by application of a $V_L$ voltage over time frame $t_1$ as shown in the time varying voltage waveform 312 shown in FIG. 3D, positively charged chemical species 309 (e.g., fuel fragments, positively charged ions, etc.) are electrostatically attracted to the electrode 308 and negatively charged chemical species and electrons 311 are electrostatically repelled from the electrode 308. FIG. 3C illustrates that when the electrode 308 is positively charged by application of a $V_H$ voltage over time frame $t_2$ as shown in the time varying voltage waveform 312 shown in FIG. 3D, negatively charged chemical species 311 (e.g., negatively charged ions, etc.) and electrons are electrostatically attracted to the electrode 308 and positively charged chemical species 309 are electrostatically repelled from the electrode 308. Thus, over one or more cycles of the time varying voltage waveform 312, the negatively and positively charged chemical species and electrons introduced and/or generated during the gasification process are agitated in the reaction region 306. It is currently believed by the inventor that agitation of the chemical species in the reaction region 306 may cause an increase in a gasification reaction rate in the reaction region 306; a reduction in a temperature of the gasification reaction in the reaction region 306; an efficiency increase in the gasification reaction; a change in a gasification reaction product generated during the act of gasifying; or combinations thereof.

Figure 3D:
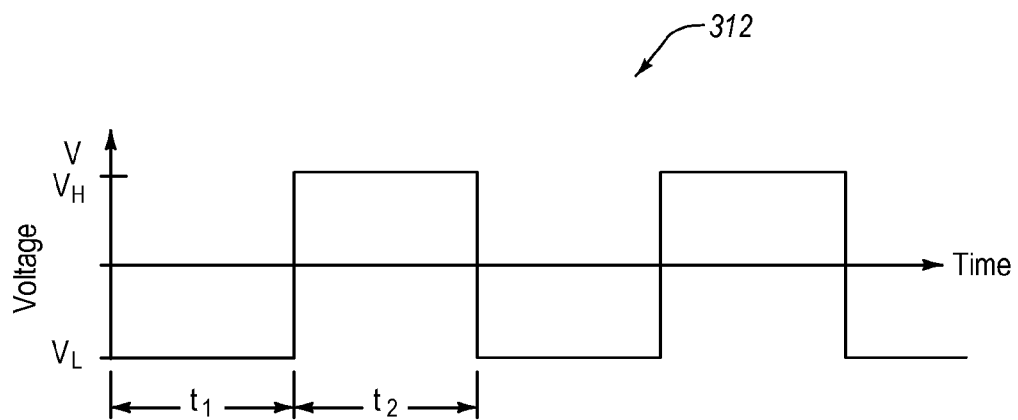
FIG. 3D is a graph illustrating a time varying voltage that may be applied to the electrode shown in FIGS. 3A-3C according to an embodiment.

It should be noted that the time varying voltage waveform 312 shown in FIG. 3D is only one embodiment of a suitable time varying voltage waveform. Other suitable time varying voltage waveforms include a sine waveform, a convoluted waveform function, an arbitrary waveform function, or a pulsed waveform.

Figure 3E:
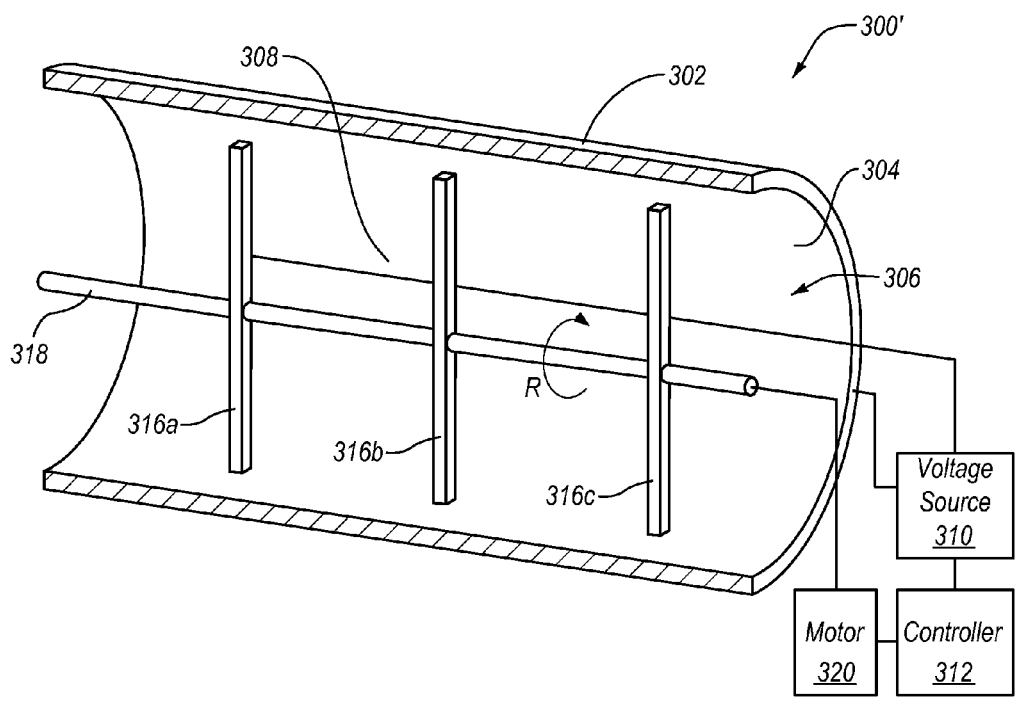
FIG. 3E is an isometric cutaway view of an embodiment of a gasifier including a plurality of electrically conductive stirring arms in which an electric field is generated between respective electrically conductive stirring arms and the reaction vessel.

FIG. 3E is an isometric cutaway view of an embodiment of a gasifier 300' including a plurality of electrically conductive stirring arms 316a-316c in which an electric field is generated between respective electrically conductive stirring arms 316a-316c and the reaction vessel 302. For example, the plurality of electrically conductive stirring arms 316a-316c may be formed from a suitable electrically conductive and durable metallic material, such as a steel. Although the plurality of electrically conductive stirring arms 316a-316c may be located in an oxidation zone, a reduction zone of the reaction region 306, or combinations thereof, in a specific embodiment, the plurality of electrically conductive stirring arms 316a-316c may be located only in the reducing zone of the reaction region 306. Additionally, although three stirring arms are shown in the illustrated embodiment in FIG. 3E, more than or less than three may be employed in other embodiments.

In the embodiment illustrated in FIG. 3E, the gasifier 300' further includes a rotatable shaft 318 on which the plurality of electrically conductive stirring arms 316a-316c are mounted and axially spaced from each other so that they rotate in different respective planes. The rotatable shaft 318 is further operably coupled to a suitable motor 320 that is coupled to the controller 312. The motor 320 may be electrically isolated from the reaction vessel 302 and the plurality of electrically conductive stirring arms 316a-316c by, for example, electrically insulating the rotatable shaft 318 or other suitable technique. Under control of the controller 312, the motor 320 is configured to rotate the rotatable shaft 318 in a direction R to help mix reaction products and/or constituents in the zone in which the plurality of electrically conductive stirring arms 316a-316c are located, such as the reduction zone.

In the illustrated embodiment, the reaction vessel 302 is coupled to the voltage source 310 along with each of the plurality of electrically conductive stirring arms 316a-316c. For example, the plurality of electrically conductive stirring arms 316a-316c may be held at a negative voltage and the reaction vessel 302 (e.g., an electrically conductive reaction vessel made from steel) may be held at ground by the voltage source 310 to generate one or more electric fields between the reaction vessel 302 and respective ends of the plurality of electrically conductive stirring arms 316a-316c for agitating chemical species in the reaction region. The strength and geometry of the one or more electric fields may be controlled by the distance of the respective ends of the plurality of electrically conductive stirring arms 316a-316c from the reaction vessel 302. Of course, other biases may be employed by the voltage source 310. Furthermore, in other embodiments, separate electrodes mounted to the interior surface 304 of the reaction vessel 302, and the electric field(s) are generated when each of the plurality of electrically conductive stirring arms 316a-316c is rotated to be in proximity to one or more corresponding electrodes.

Figure 4A:
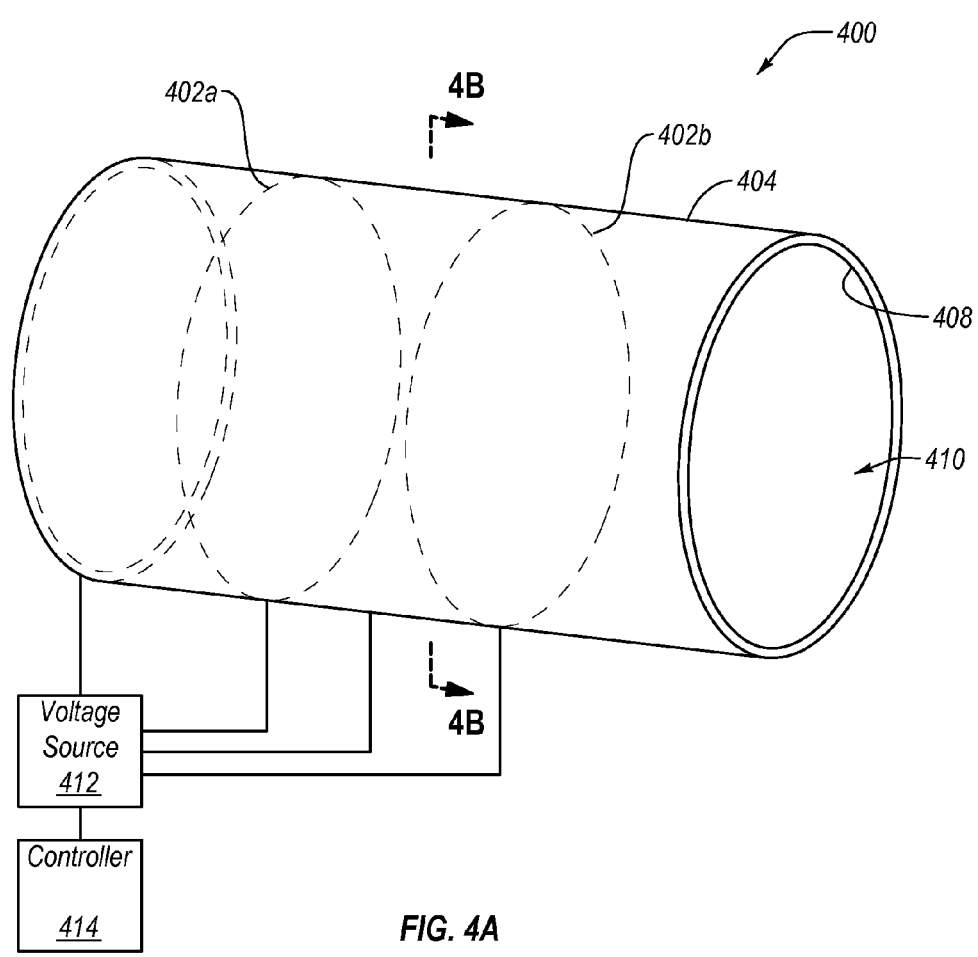
FIG. 4A is an isometric view of a gasifier that includes a plurality of sets of circularly distributed electrodes according to an embodiment.

FIG. 4A is an isometric view of a gasifier 400 that includes a plurality of sets 402a and 402b of circularly-distributed electrodes 404 according to an embodiment. The gasifier 400 includes a reaction vessel 406 having an interior surface 408 at least partially defining a reaction region 410 in which gasification reactions occur, such as the oxidation and reduction reactions previously discussed herein. For example, the sets 402a and 402b may each be positioned in the same or a different one of a drying zone, a pyrolysis zone, an oxidation zone, or a reduction zone of the reaction region 410. The electrodes 404 may be circumferentially spaced and distributed, and mounted to the interior surface 408 of the reaction vessel 406. A voltage source 412 may be operatively coupled independently to each of the electrodes 404 of the first and second sets 402a and 402b and to the reaction vessel 406 or ground. A controller 414 is provided that is operatively coupled to the voltage source 412, and controls the operation of the voltage source 412.

Figure 4B:
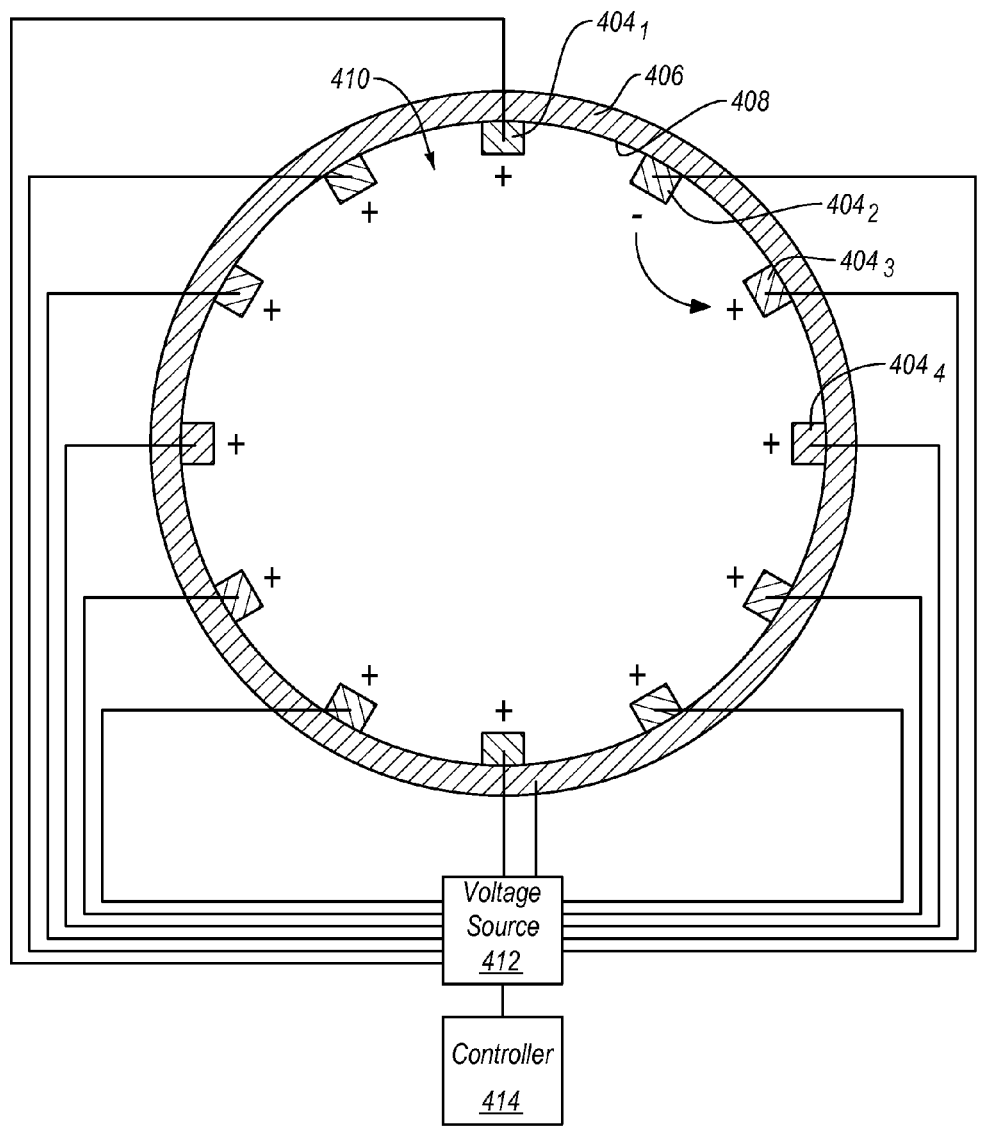
FIG. 4B is a cross-sectional view of the reaction vessel of FIG. 4A at a first instance during a time varying voltage cycle that may be applied to the electrodes of one set of the circularly distributed electrodes according to an embodiment.
Figure 4C:
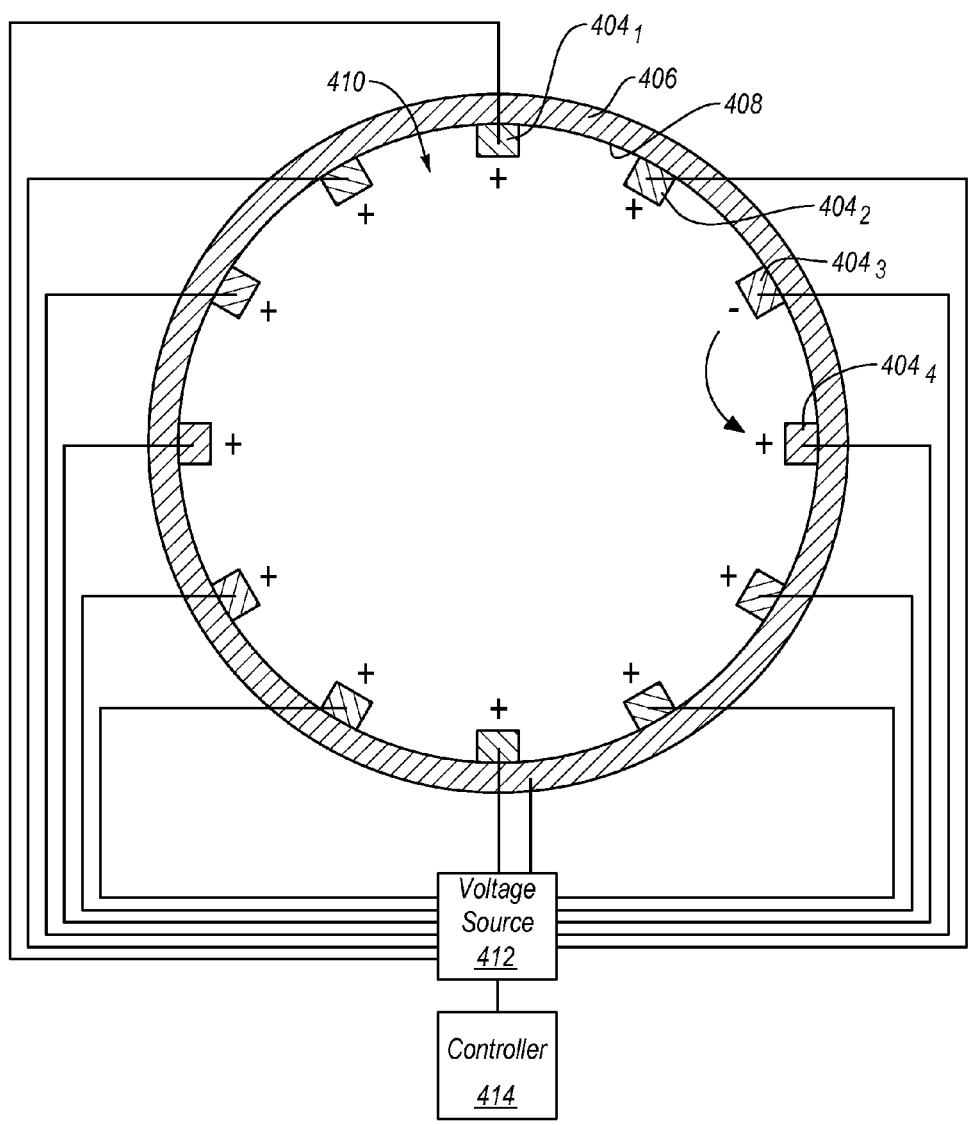
FIG. 4C is a cross-sectional view of the reaction vessel of FIG. 4A at a second instance during a time varying voltage cycle that may be applied to the electrodes of one set of the circularly distributed electrodes according to an embodiment.
Figure 4D:
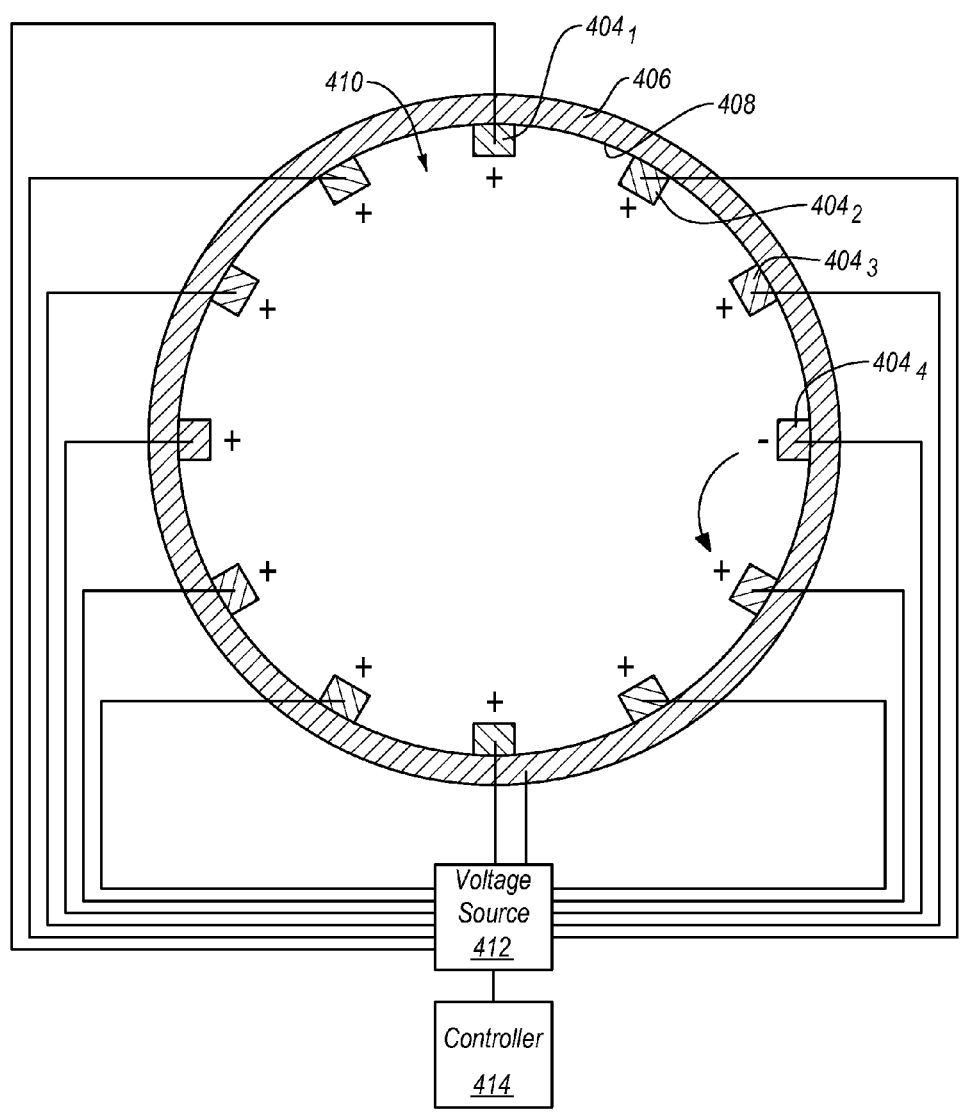
FIG. 4D is a cross-sectional view of the reaction vessel of FIG. 4A at a third instance during a time varying voltage cycle that may be applied to the electrodes of one set of the circularly distributed electrodes according to an embodiment.

FIG. 4B is a cross-sectional view of the reaction vessel 406 of FIG. 4A at a first instance during a time varying voltage cycle that may be applied to the electrodes 404 of one set 402a of the circularly distributed electrodes via the voltage source 412 during gasification of at least one carbon-containing feed material introduced into the reaction region 410 according to an embodiment. Only the set 402a is shown in FIGS. 4B-4D, but it should be understood that the same or different applied voltages may be applied to the electrodes 404 of the set 402b. In other embodiments, only one set or more than two sets of electrodes 404 may be provided. As shown in FIG. 4B, the electrodes 404 may have a voltage applied thereto so that all of the electrodes 404 other than the electrode $404_2$ be positively charged, which is negatively charged. In such an embodiment, positively charged chemical species in the reaction region 410 may be attracted to the electrode $404_2$ while negatively charged chemical species may be attracted to the other electrodes 404.

As shown in FIG. 4C, the electrodes 404 may have a voltage applied thereto so that all of the electrodes 404 other than the electrode $404_3$ be positively charged, which is negatively charged. In such an embodiment, positively charged chemical species in the reaction region 410 may be attracted to the electrode $404_3$ while negatively charged chemical species may be attracted to the other electrodes 404. As shown in FIG. 4D, the electrodes 404 may have a voltage applied thereto so that all of the electrodes 404 other than the electrode $404_4$ be positively charged, which is negatively charged. In such an embodiment, positively charged chemical species in the reaction region 410 may be attracted to the electrode $404_4$ while negatively charged chemical species may be attracted to the other electrodes 404. This pattern of applied voltages may be continued until each of the electrodes $404_{5-1}$ is selectively negatively charged and, then, the sequence of applied voltages to the electrodes 404 may be repeated again, as desired. This time varying applied voltage waveform applied to the electrodes 404 causes the positively charged chemical species in the reaction region 410 to move generally circularly in a clockwise direction, thereby resulting in agitation and/or mixing of the chemical species in the reaction region 410.

It should be noted that the time varying voltage applied to the electrodes 404 and the resultant electric fields generated may be varied in other embodiments. For example, the position of the electrode 404 that is negatively charged may be moved in a counterclockwise direction. In an embodiment, each one of the electrodes 404 may be negatively charged sequentially in a counterclockwise or clockwise direction. In other embodiments, every two of the electrodes 404 or other selected number may be negatively charged sequentially in a counterclockwise or clockwise direction. In an embodiment, the electrode 404 adjacent to and on the downstream side of the electrode 404 that is negatively charged downstream (e.g., electrode $404_3$ in FIG. 4B) may have a lower positive voltage applied to it relative to the electrode $404_1$ in FIG. 4B, which assists with movement of positively charged chemical species in the clockwise direction. Of course, in other embodiments, each one of or other selected number the electrodes 404 may be positively charged sequentially in a counterclockwise or clockwise direction while the other electrodes 404 are negatively charged.

Figure 5:
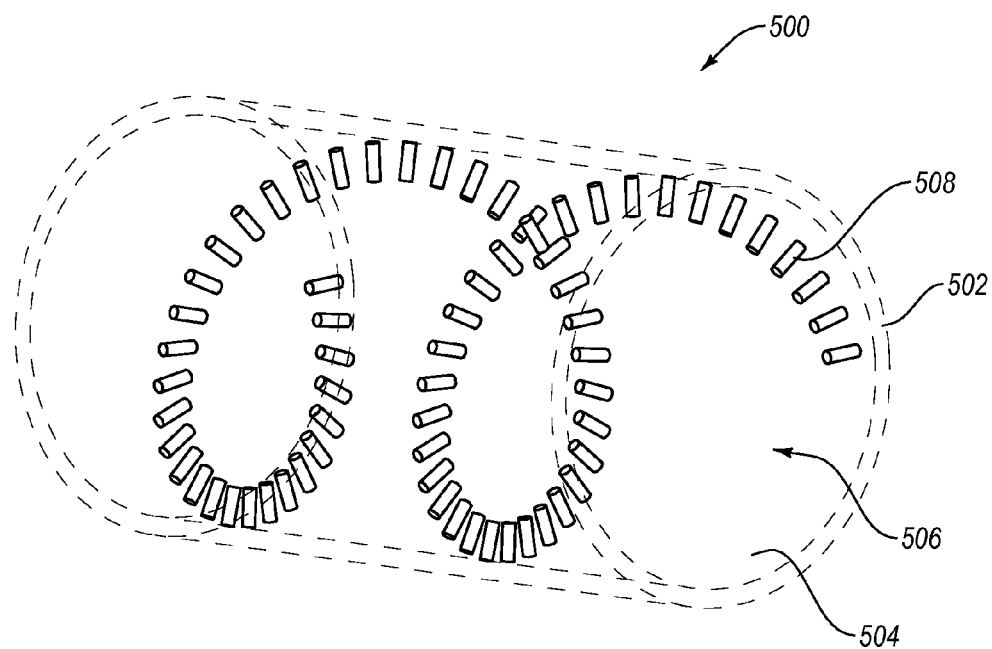
FIG. 5 is an isometric view of a gasifier that includes a plurality of electrodes arranged in a spiral pattern according to an embodiment.

FIG. 5 is an isometric cutaway view of a gasifier 500 including a plurality of electrodes arranged in a spiral pattern according to an embodiment. The gasifier 500 includes a reaction vessel 502 having an interior surface 504 at least partially defining a reaction region 506. A plurality of electrodes 508 are mounted to the interior surface 504. The electrodes 508 may be spaced from each other and arranged in a spiraling pattern. For example, the electrodes 508 may be positioned in a drying zone, a pyrolysis zone, an oxidation zone, a reduction zone of the reaction region 506, or combinations thereof. In an embodiment, the electrodes 508 may be positioned in only one of the pyrolysis zone, oxidation zone, or reduction zone of the reaction region 506, while in other embodiments, the electrodes 508 may span across two or more of the zones.

As with the embodiment shown in FIGS. 4A-4D, each one of the electrodes 508 or other selected number may be negatively charged sequentially in a selected path direction. In an embodiment, the electrode 508 adjacent to and on the downstream side of the electrode 508 that is negatively charged downstream may have a lower positive voltage applied to it, which assists with movement of positively charged chemical species in the clockwise direction. Of course, in other embodiments, each one of or other selected number the electrodes 508 may be positively charged sequentially in a selected path direction while the other electrodes 404 are negatively charged.

Figure 6:
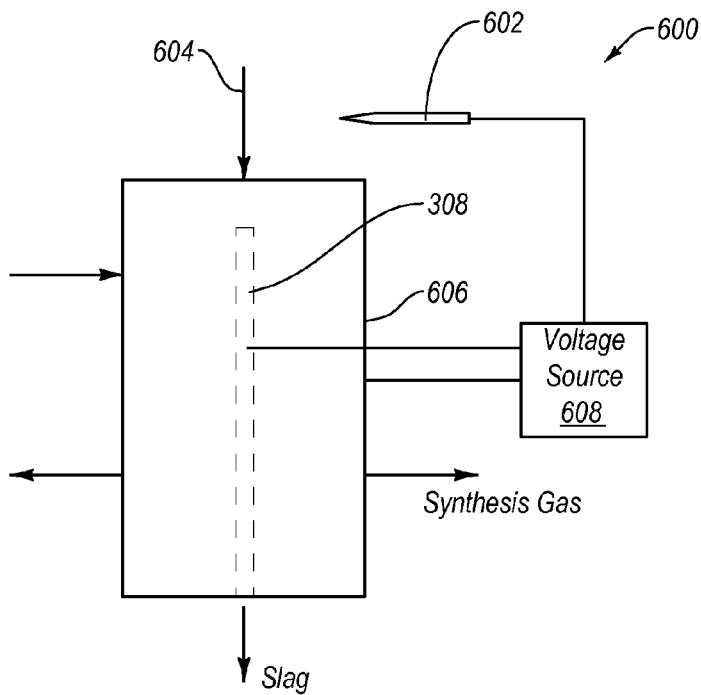
FIG. 6 is a schematic diagram illustrating an up draft gasifier including an ionizing element configured to ionize an incoming feed of at least one hydrocarbon-containing feed material according to an embodiment.

In some applications, it may be desirable to charge the fuel fed into the gasifier prior to the fuel being subject to the gasification process. For example, FIG. 6 is a schematic diagram illustrating a gasifier 600 including an ionizing element 602 configured to ionize an incoming feed 604 of at least one hydrocarbon-containing feed material according to an embodiment. In some types of gasifiers, the feed may be a fluid flow including particulates of the at least one hydrocarbon-containing feed material. For example, in an entrained flow gasifier, the incoming feed 604 may be a dry pulverized solid, an atomized liquid fuel, or a fuel slurry is gasified with oxygen or air in co-current flow. The gasification reactions take place in a dense cloud of very fine particles in a reaction vessel 606. Many coals are suitable for this type of gasifier because of the high operating temperatures and because the coal particles are well separated from one another.

The ionizing element 602 may be a sharp electrode that is configured to emit ions into the incoming feed 604 to ionizing the incoming feed 604. For example, the ionizing element 602 may be characterized as an ionizing electrode because a curvature and increase of the electric field strength proximity to the sharp surface is associated with insertion of ions from the ionizing element 602 into the incoming feed 604 upon application of high voltage to the ionizing element 602. For example, a voltage source 608 may be operatively coupled to the ionizing element 602 and configured to apply a high voltage thereto to cause ion emission. An example of a sharp or ionizing electrode is a corona wire. The inserted ions may be referred to as a corona discharge. Depending upon the polarity of the high voltage applied to the ionizing element 602, negative or positive ions may be emitted from the ionizing element 602 so that the incoming feed 604 and the chemical species developed during the gasification process may exhibit either a net positive or negative charge.

The reaction vessel 606 may employ any of the electrode systems disclosed herein for agitating the chemical constituents in the reaction vessel. As merely an example, the electrode 308 shown in FIG. 3A may be included in the reaction vessel 606 and operatively coupled to the voltage source 608. The electrode 308 may be subjected to a time varying voltage waveform (e.g., the time varying voltage waveform 312 shown in FIG. 3D) applied by the voltage source 608 that causes, for example, positively charged chemical species in the reaction vessel 606 proximate to the electrode 308 to be cyclically attracted and repulsed from the electrode 308 to agitate the positively charged chemical species during the gasification processes.

It should be appreciated that the voltage source in any of the embodiments disclosed herein may be controlled by a controller (e.g., the controller 312 or 414) associated a computer system having at least one processor configured to execute computer-executable instructions and process operational data. For example, the processor may be operably coupled to a memory storing an application including computer-executable instructions and operational data constituting a computer program to cause the voltage source to apply any of the time varying voltage waveforms disclosed herein.

The memory may be embodied as a computer readable medium, such as a random access memory ("RAM"), a hard disk drive, a static storage medium such as a compact disk, DVD, or other non-transitory storage medium. The memory may further store property data describing properties of the flame and/or electrode assemblies determined as described hereinabove. The computer system may further include a display coupled to the processor. The processor may be operable to display the images of the flame and other graphical illustrations of the characteristics of the flame on the display.

While various aspects and embodiments have been disclosed herein, other aspects and embodiments are contemplated. The various aspects and embodiments disclosed herein are for purposes of illustration and are not intended to be limiting.

The invention claimed is:

1. A gasifier, comprising:
   a fuel hopper configured to receive at least one hydrocarbon-containing feed material;
   a reaction vessel positioned and configured to receive the at least one hydrocarbon-containing feed material from the fuel hopper, the reaction vessel configured to gasify the at least one hydrocarbon-containing feed material to synthesis gas, the reaction vessel including:
      at least one inlet configured to receive a gasification medium that reacts with the at least one hydrocarbon-containing feed material;
      an outlet configured to allow the synthesis gas to exit from the reaction vessel;
      a reaction region; and
      a grate positioned below the reaction region;
   an ionizing element positioned and configured to charge at least a portion of the at least one hydrocarbon-containing feed material prior to the at least one hydrocarbon-containing feed material entering the reaction vessel;
   at least one electrode positioned to be in electrical communication with the reaction region; and
   a voltage source operatively coupled to the at least one electrode, the voltage source and the at least one electrode cooperatively configured to generate a time varying electric field in the reaction region to effect electrodynamic mixing of charged chemical species therein during gasification.

2. The gasifier of claim 1 wherein the reaction vessel forms an additional electrode operatively coupled to the voltage source.

3. The gasifier of claim 1 wherein the at least one electrode includes a plurality of electrodes that are spaced in the reaction vessel.

4. The gasifier of claim 3 wherein each of the plurality of electrodes and the voltage source are cooperatively configured such that each of the plurality electrodes is independently biasable.

5. The gasifier of claim 1 wherein the at least one electrode includes a plurality of electrodes that are longitudinally spaced and each of the plurality of electrodes are arranged to form a spiral within the reaction vessel.

6. The gasifier of claim 1 wherein the at least one electrode includes at least one set having a plurality of electrodes that are circumferentially spaced from each other.

7. The gasifier of claim 6 wherein the voltage source is configured to independently bias each of the plurality of electrodes of the at least one set.

8. The gasifier of claim 6 wherein the voltage source is configured to selectively change an applied voltage to at least some of the plurality of electrodes in a sequence that moves at least some of the charged chemical species along a selected path.

9. The gasifier of claim 1 wherein the ionizing element includes a sharp electrode.

10. The gasifier of claim 1 wherein application of the time varying voltage by the voltage source to the at least one electrode in electrical communication with the reaction region effects at least one of:
- an increase in a gasification reaction rate in the reaction region;
- a reduction in a temperature of the gasification reaction;
- an efficiency increase in the gasification reaction; or
- a change in a gasification reaction product generated during gasification.

11. The gasifier of claim 1 wherein the at least one electrode is positioned in at least one of an oxidation zone or a reduction zone of the reaction region of the reaction vessel.

12. The gasifier of claim 1 wherein the fuel hopper is positioned at an upper region of the reaction vessel.

13. The gasifier of claim 1 wherein the grate is positioned below the fuel hopper and configured to allow the synthesis gas to pass therethrough.

14. The gasifier of claim 1 wherein the at least one inlet is positioned proximate to the grate, and the outlet is positioned upwardly relative to the grate and proximate to the fuel hopper for allowing the synthesis gas to pass therethrough and exit the reaction vessel.

15. The gasifier of claim 1 wherein the at least one inlet is positioned upwardly relative to the grate, and the outlet is positioned below the grate for allowing the synthesis gas to pass therethrough and exit the reaction vessel.

16. The gasifier of claim 1 wherein the reaction vessel is configured for use in an up draft gasifier or a down draft gasifier.

17. The gasifier of claim 1 wherein the at least one electrode includes a plurality of electrically conductive stirring arms and the reaction vessel.

* * * * *